Jan. 10, 1939.  P. E. ERICKSON  2,143,123
SISAL AND FIBER CUTTING APPARATUS
Filed June 14, 1937   2 Sheets-Sheet 1
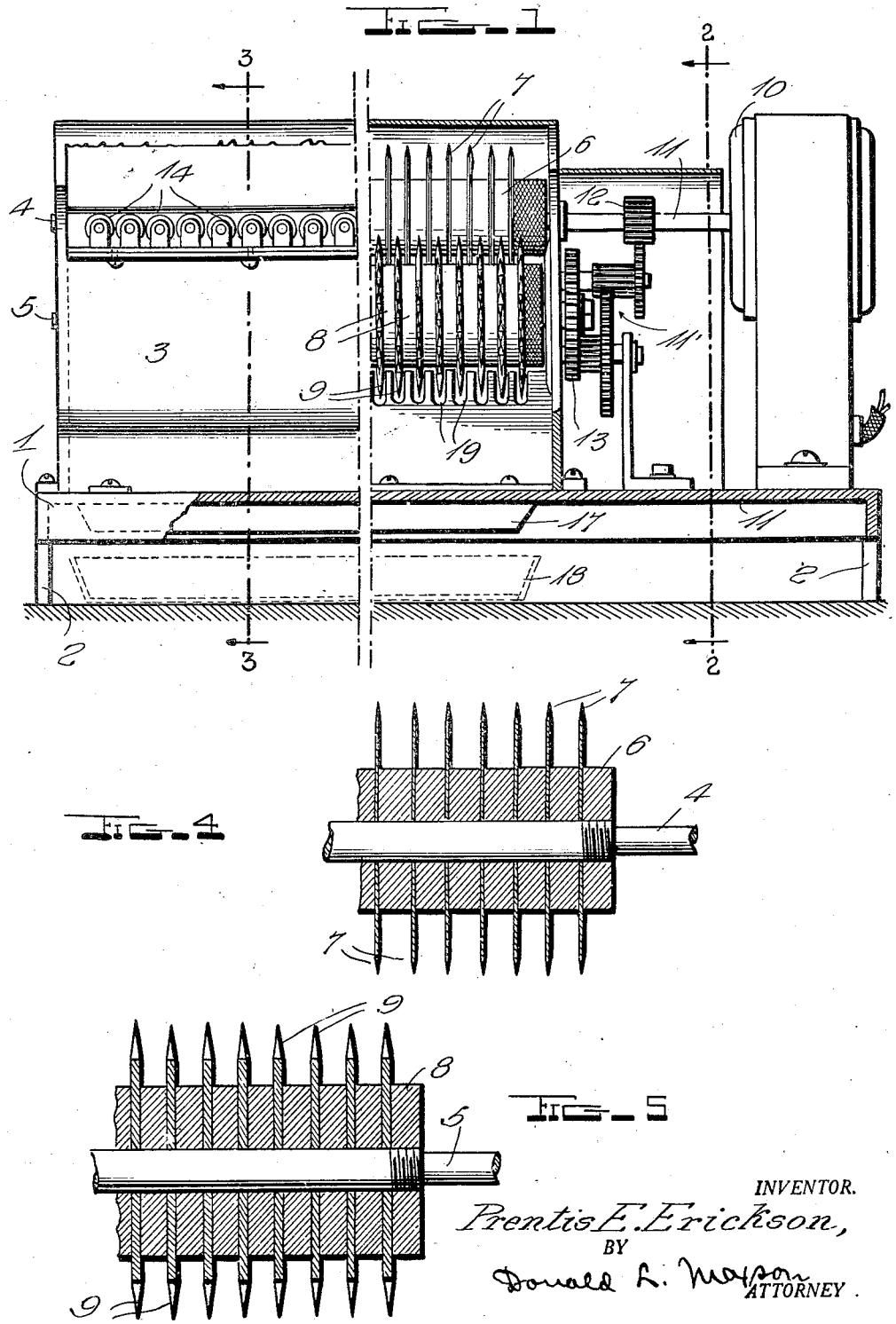
INVENTOR.
Prentis E. Erickson,
BY
Donald L. Masson
ATTORNEY.

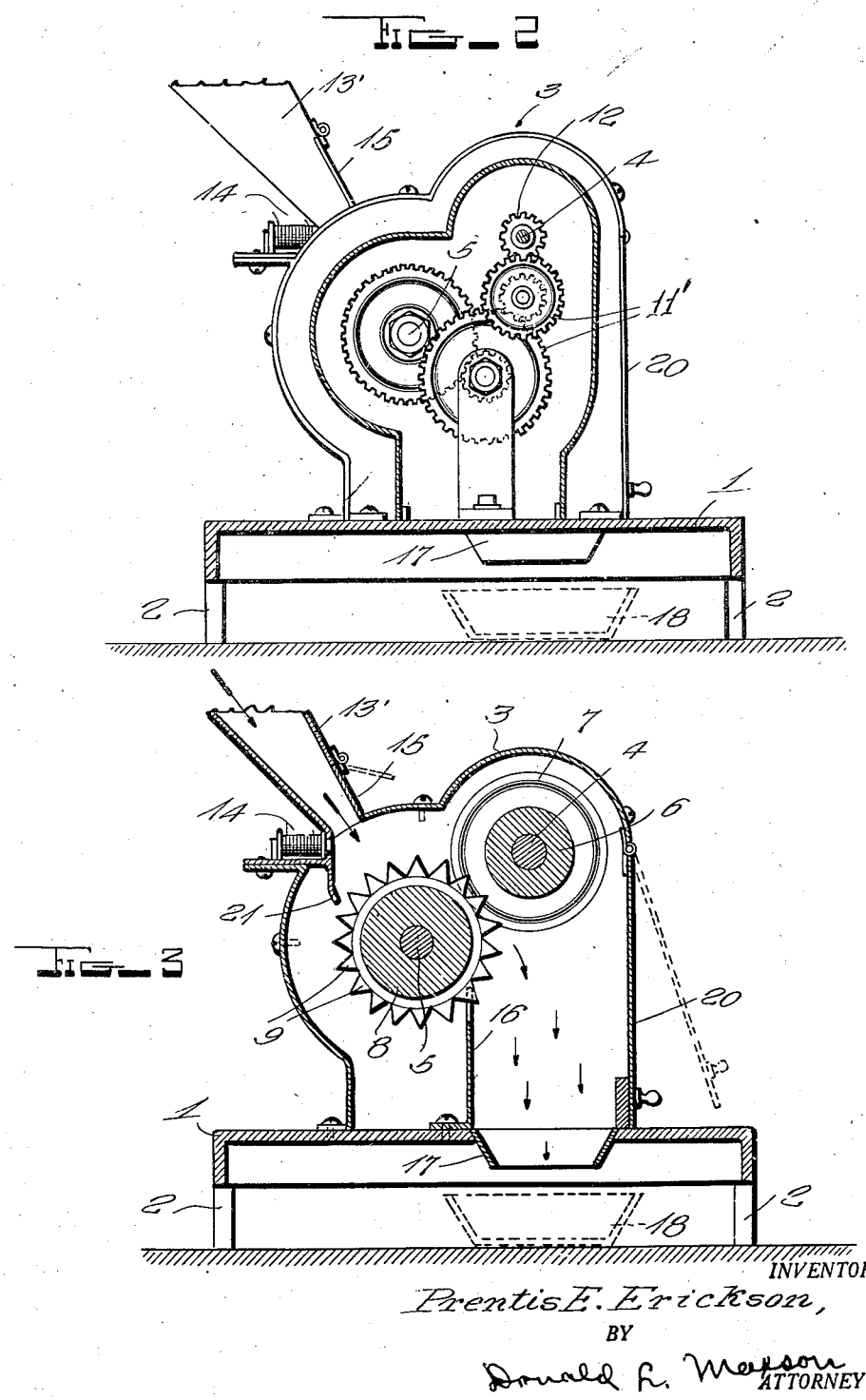

Patented Jan. 10, 1939

2,143,123

UNITED STATES PATENT OFFICE 2,143,123

SISAL AND FIBER CUTTING APPARATUS

Prentis E. Erickson, Minneapolis, Minn., assignor to James B. Bradshaw, Minneapolis, Minn.

Application June 14, 1937, Serial No. 148,188

2 Claims. (Cl. 164—60)

This invention relates to improvements in sisal and other fiber cutting machines, and more particularly to a machine which will employ a pair of longitudinal and parallel members having a plurality of spaced intersecting and coacting cutting teeth and knives, between which the fiber is fed to be thoroughly cut into small pieces suitable for many purposes.

An object of my invention is to provide an improved sisal and fiber cutting machine which will be provided with coacting series of cutting teeth and rotary or disk knives, which will be rotated towards each other, and between which the sisal or other fibers will be fed through a suitable trough or chute, and when finally cut to the desired size, the fibers will be automatically discharged through a second chute located below the cutting elements.

Another object of the invention is to provide an improved sisal and fiber cutting apparatus, which will be provided with magnetic means for picking up any foreign metal from the fibers being fed to the cutting elements, thereby saving and protecting the cutting teeth and disk cutters of the apparatus from being injured should any metal piece, such as a beater tooth from a preceding machine be fed to the cutting apparatus with the fiber to be cut.

A further object of the invention is to provide an improved sisal and fiber cutting apparatus which will be highly efficient in operation and relatively inexpensive to manufacture.

A still further object of the invention is to provide a sisal and fiber cutting apparatus with coacting and cooperating cutting teeth and disk knives, which will be so arranged that they may be readily spaced the desired distance apart for cutting the fibers into the desired size.

Other objects will appear as the description proceeds.

In the accompanying drawings which constitute a part of my application,

Figure 1 is a front elevation with parts broken away and in section of my improved sisal and fiber cutting apparatus;

Figure 2 is a transverse vertical sectional view taken on the line 2—2 of Figure 1;

Figure 3 is a transverse vertical sectional view taken on the line 3—3 of Figure 1;

Figure 4 is an enlarged detail view of the disk cutting knives, and

Figure 5 is an enlarged detail view of the rotary toothed cutting elements.

Like characters of reference are used throughout the following specification and the accompanying drawings to designate corresponding parts.

In carrying out my invention, I provide a base 1 suitably supported by the legs 2. Disposed upon the base 1 is a housing 3, as clearly shown in Figures 1, 2 and 3. The opposite ends of the housing 3 form bearings for the ends of the shafts 4 and 5, upon which are mounted the spacing members 6 and disk cutting knives 7, and the spacing members 8 and the toothed cutting disks or blades 9, 10 respectively. From the drawings, it will be apparent that the disk cutting knives 7 are sharpened about their peripheral edges, and that the cutting toothed elements or blades 9 are made thicker than the knives 7, and that the spacing between the disk or knives may be changed by merely inserting the desired thickness of spacing members. It will be further seen that the knives 7 and 9 overlap and rotate towards each other to draw in the fiber between the cutting elements as it is fed to the apparatus.

A suitable motor 10 is used for driving the cutting apparatus, and is mounted upon one end of the base 1, and is connected through the driving shaft 11 and the several cooperating gears forming the gear train 11', to the gears 12 and 13 on the adjacent ends of the shafts 4 and 5 upon which the cutting elements are mounted.

A feed chute 13' is positioned at the front of the apparatus, and will support a plurality of magnets 14 connected to a suitable source of electrical supply, and have their energized pole pieces adjacent the innermost edge of the chute, so that in the event a piece of metal such as a broken beater tooth or any foreign metal object which may accidentally be fed into the apparatus with the sisal or fiber to be cut up, will be drawn to the magnets and held thereon, instead of being fed to the cutting elements where great damage would be done were this permitted. I have illustrated a door 15 in the chute 11, through which the foreign pieces of metal may be withdrawn from the apparatus, or which serves also to give access to the inner end of the chute to prevent clogging of the same.

A toothed stripping or guard plate 16 is disposed on the base 1 below the toothed cutting elements and behind the same, as clearly shown in Figure 3 of the drawings. The purpose of this plate is to strip off the fibers after they are cut up, and to guide the cut fibers into the discharge chute 17 which extends through the base 1, and into a suitable container 18. The toothed blades 9 will rotate through the notches or tooth spaces between the teeth 19 in the stripping plate 16, as shown in Figure 1. A suitable door 20 will be formed in the rear portion of the housing 3 whereby access may be had to the cutting elements and the associated apparatus. The downwardly extending lip 21 below the feed chute 13' will be made quite flexible to permit the passing of any object down to the bottom of the apparatus instead of to the cutting elements, should any object or foreign matter be accidentally dropped into the apparatus while the same was not in operation.

Many minor changes in detail of construction may be resorted to without departure from the spirit of the invention.

Having thus described my invention what I claim as new and desire to secure by Letters Patent of the United States is:

1. In a fiber cutting apparatus, the combination with a plurality of spaced cutting disk knives, a plurality of spaced toothed cutting knives of thicker material than said cutting disks cooperating with said disk knives and overlapping the same, means for rotating said sets of knives towards each other, a material feed chute disposed above said knives, and a discharge chute disposed below said knives.

2. The subject matter as set forth in claim 1, and magnetic separation means carried by the feed chute whereby any foreign metal object fed to the apparatus may be picked up by said magnetic separation means and prevented from getting into the fiber cutting portion of said apparatus.

PRENTIS E. ERICKSON.